United States Patent [19]

Tager et al.

[11] Patent Number: 5,594,993
[45] Date of Patent: Jan. 21, 1997

[54] HAND-HELD BUILDER'S SQUARE AND STRING LINE DEVICE INCORPORATING A LASER

[75] Inventors: Robert C. Tager; Herbert P. Radding, both of Saratoga; Roger D. Ludlow, Sunnyvale, all of Calif.

[73] Assignee: Builders Tools, Inc., Saratoga, Calif.

[21] Appl. No.: 493,482

[22] Filed: Jun. 22, 1995

[51] Int. Cl.⁶ ............................ G01C 15/00; G01C 15/12; G01C 15/14
[52] U.S. Cl. .................... 33/227; 33/DIG. 21; 356/247
[58] Field of Search .................. 33/227, 290, DIG. 21; 356/138, 148, 247, 248

[56] References Cited

U.S. PATENT DOCUMENTS

| | | | |
|---|---|---|---|
| 2,877,555 | 3/1959 | Visockis, Jr. | 33/73 |
| 3,897,637 | 8/1975 | Genho | 33/227 |
| 4,111,564 | 9/1978 | Trice, Jr. | 356/247 |
| 4,333,242 | 6/1982 | Genho, Sr. | 33/227 |
| 4,912,851 | 4/1990 | Rando et al. | 33/227 |
| 5,075,977 | 12/1991 | Rando | 33/227 |
| 5,111,476 | 5/1992 | Hollenbeck et al. | 372/107 |
| 5,299,375 | 4/1994 | Thummel et al. | 42/103 |
| 5,307,368 | 4/1994 | Hamar | 372/107 |
| 5,367,779 | 11/1994 | Lee | 33/DIG. 21 |
| 5,491,555 | 2/1996 | Romine | 33/DIG. 21 |
| 5,519,942 | 5/1996 | Webb | 33/DIG. 21 |

FOREIGN PATENT DOCUMENTS

| | | | |
|---|---|---|---|
| 401815 | 12/1990 | European Pat. Off. | 33/DIG. 21 |
| 2636732 | 3/1990 | France | 33/DIG. 21 |
| WO91/02217 | 2/1991 | WIPO | 33/DIG. 21 |
| 9119157 | 12/1991 | WIPO | 33/227 |

*Primary Examiner*—Thomas B. Will
*Attorney, Agent, or Firm*—Elliot B. Aronson

[57] ABSTRACT

A compact, low-cost, hand-held builder's tool for use in defining reference lines perpendicular and parallel to a specified surface. The tool comprises a housing that is generally small enough to fit conveniently in the user's hand and that includes a battery-powered laser for projecting a visible laser beam through an exit window in the housing over an extended range. An on-board alignment mechanism is provided within the housing for adjusting and setting the alignment of the laser beam in fixed disposition for establishing an accurate reference line. The housing has two generally parallel broad faces joined by a plurality of connecting faces extending substantially perpendicular to the broad faces. One of the broad faces and two of the perpendicular connecting faces taken together define three reference planes that are mutually perpendicular to one another within a margin sufficiently small that the tool has an accuracy suitable for use over an extended range of at least about 20 ft (about 6.1 m). A practical tool may even be made with an accuracy suitable for use over a range of about 60 ft (18.29 m) or more. The on-board alignment mechanism enables the laser beam to be aligned in accurate perpendicularity to one of the mutually perpendicular reference planes and in accurate parallelism to the other two reference planes. In this way the builder's tool may project a line of laser light that is perpendicular to or parallel to a working surface in contact with one of the three faces defining the reference planes to within at least about ±⅛ inch (±3.175 mm) at 20 ft (i.e., at 6.10 m), and may be set to a further accuracy of at least ±⅛ inch (±3.175 mm) at 60 ft (18.29 m). Particular examples of on-board screw-thread alignment mechanisms and cam-operated alignment mechanisms are disclosed.

32 Claims, 8 Drawing Sheets

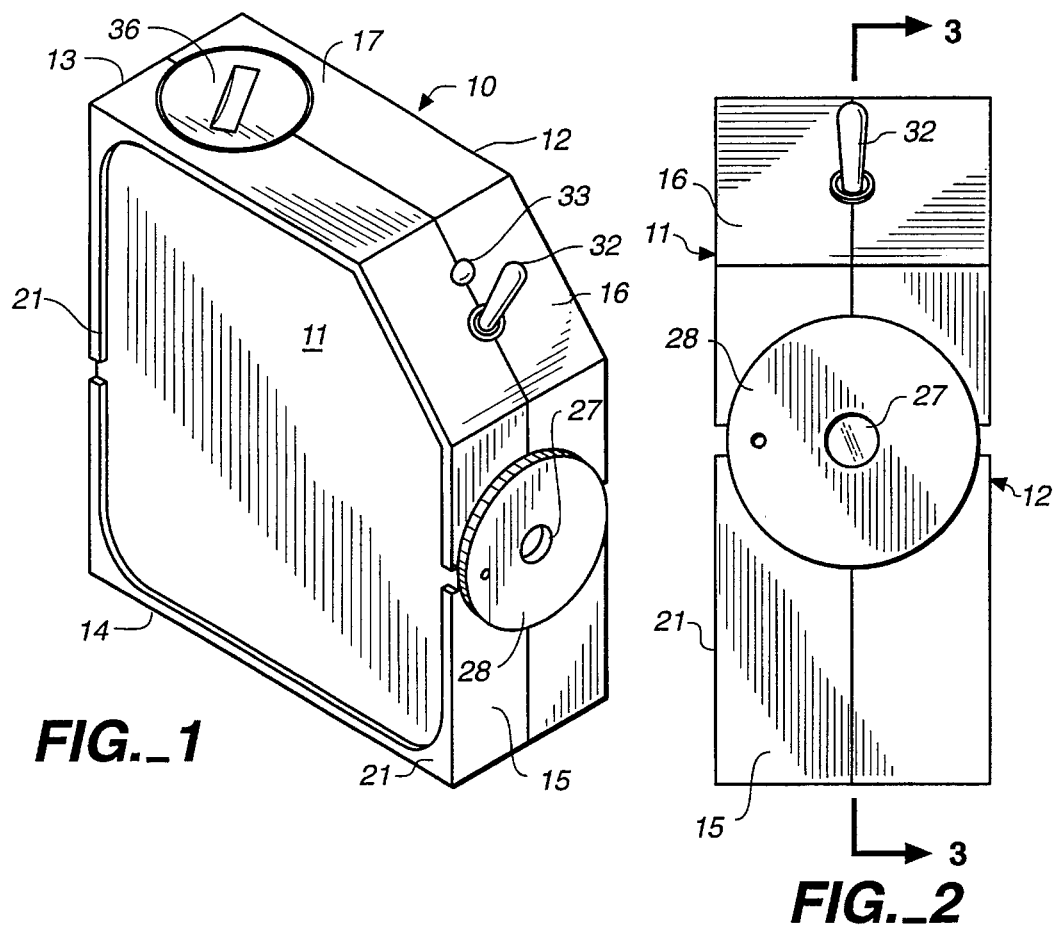
FIG._1
FIG._2
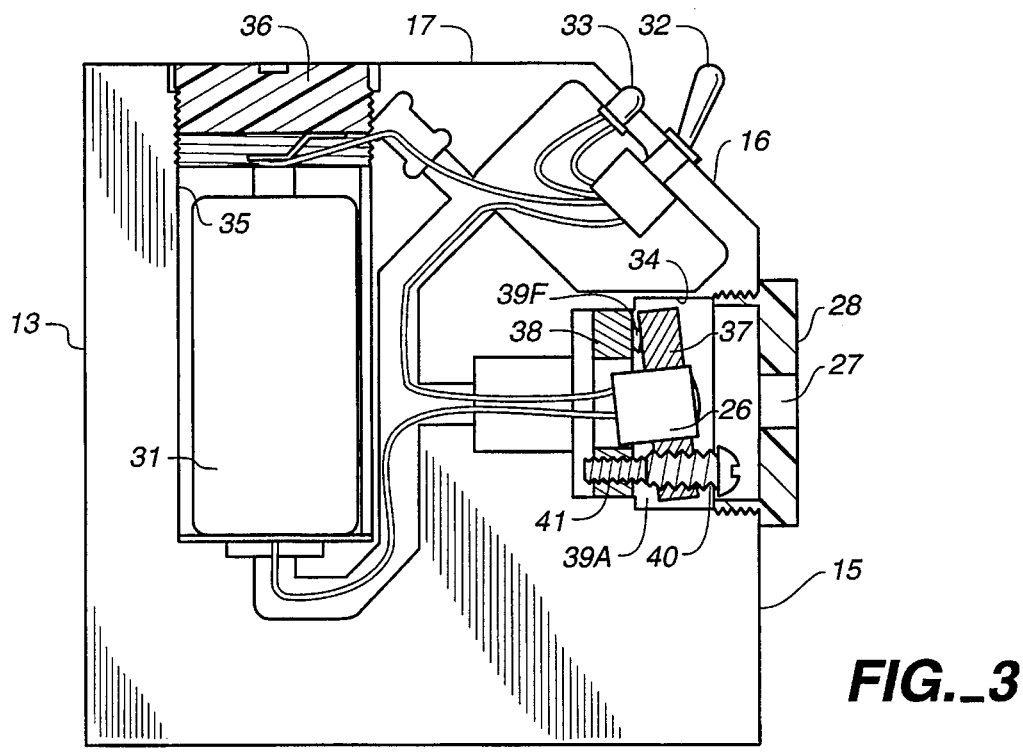
FIG._3

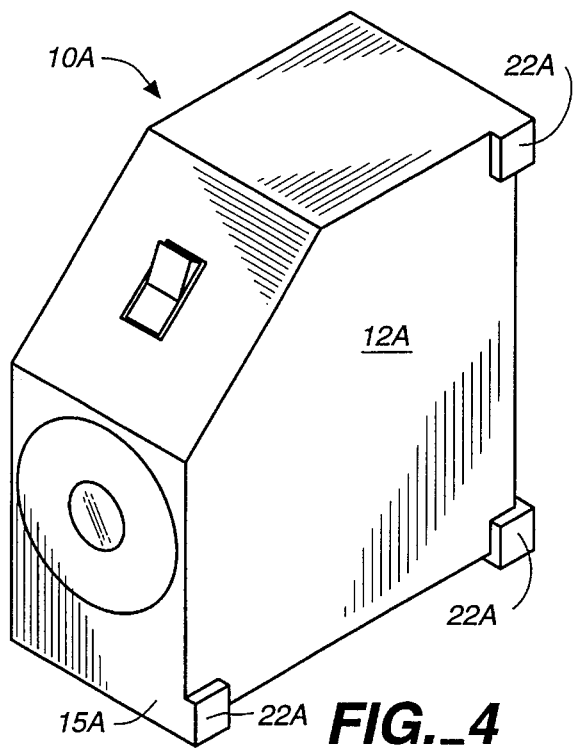
FIG._4
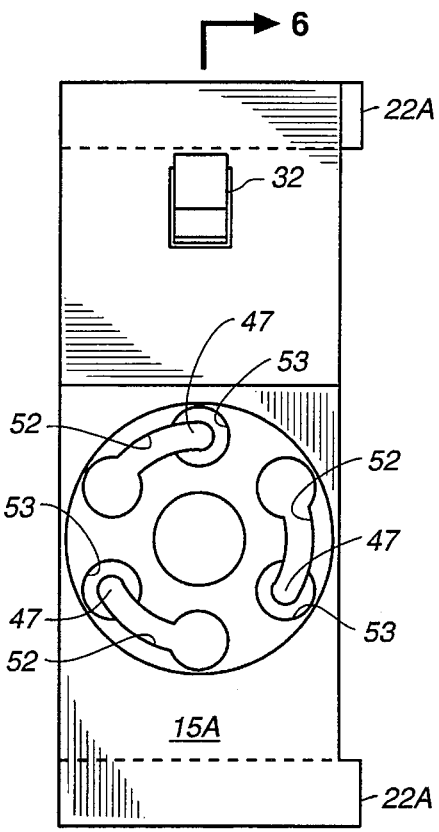
FIG._5
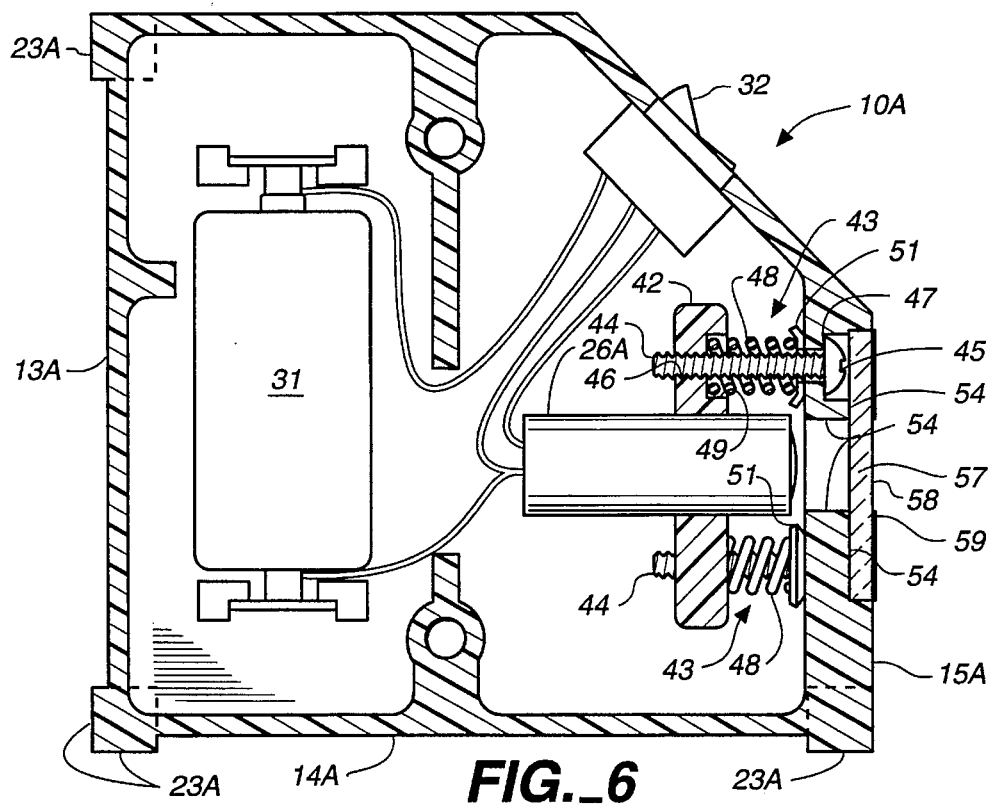
FIG._6

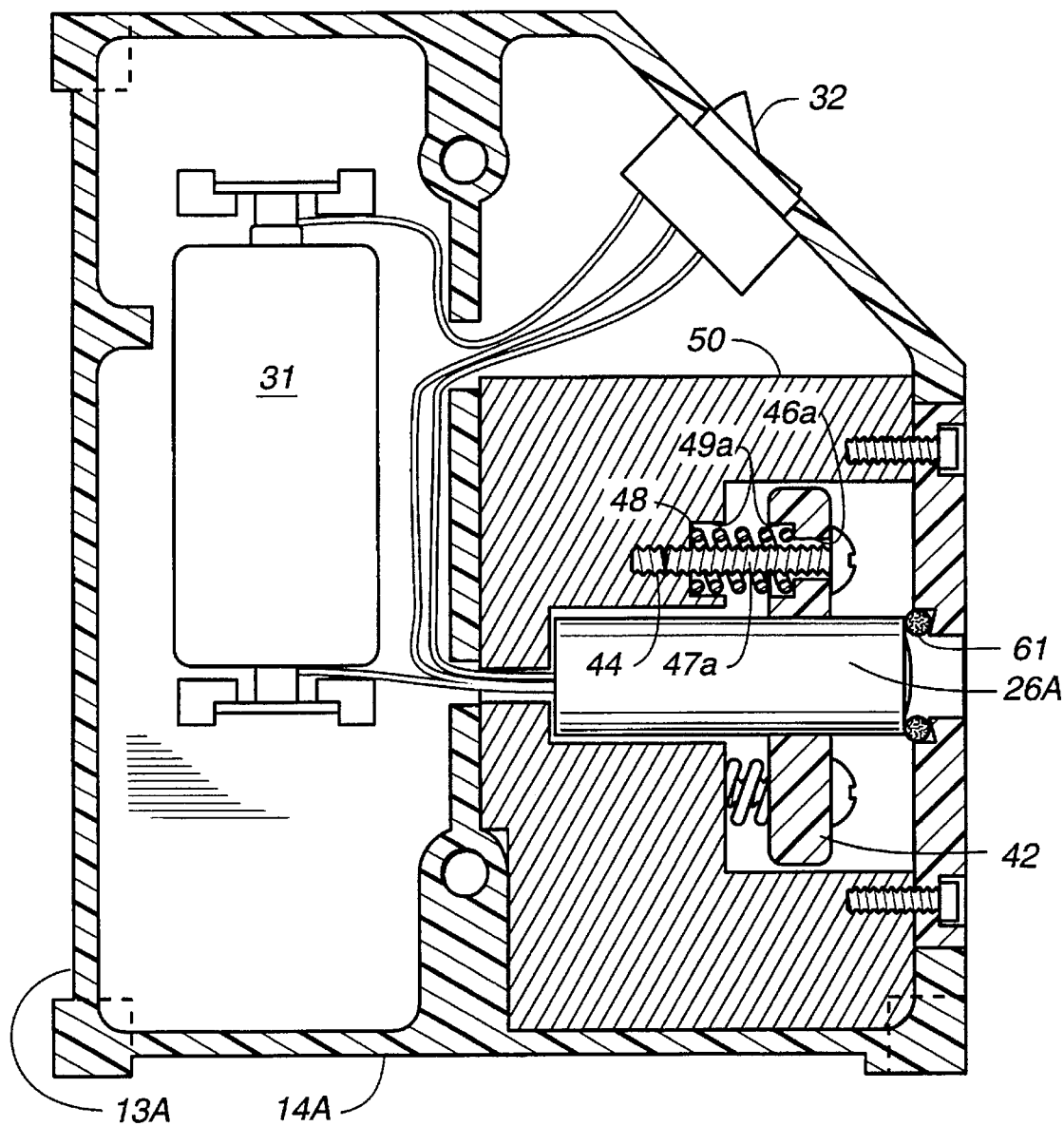
FIG._6A

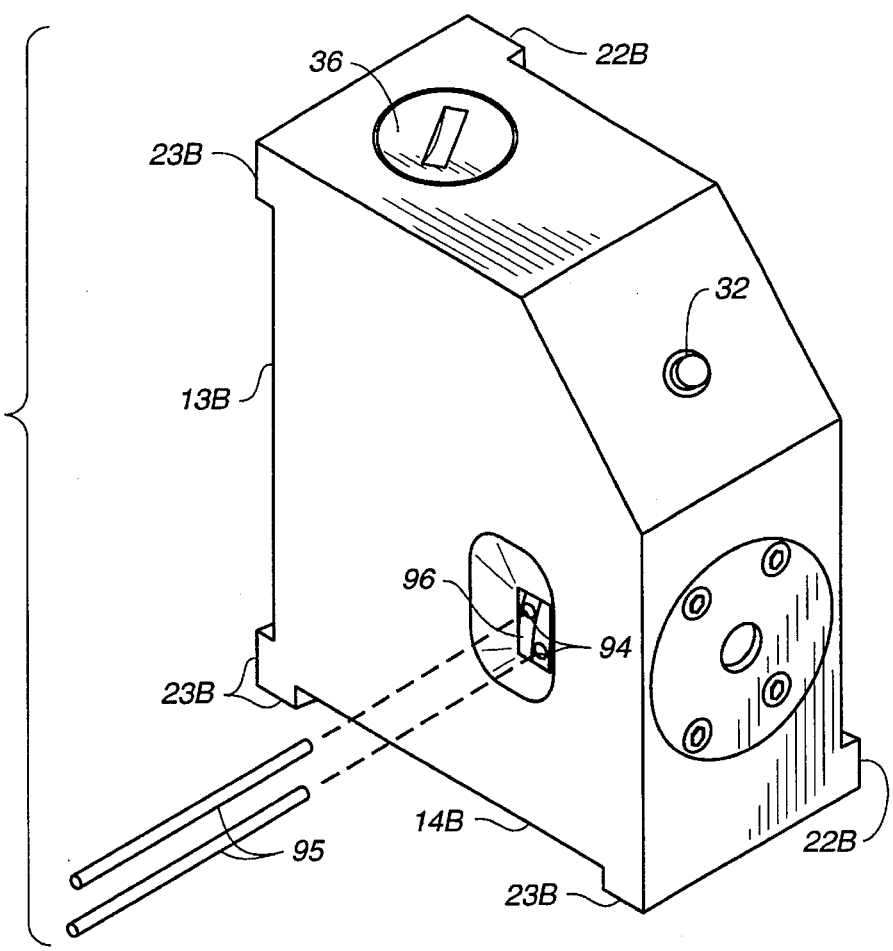
FIG._7

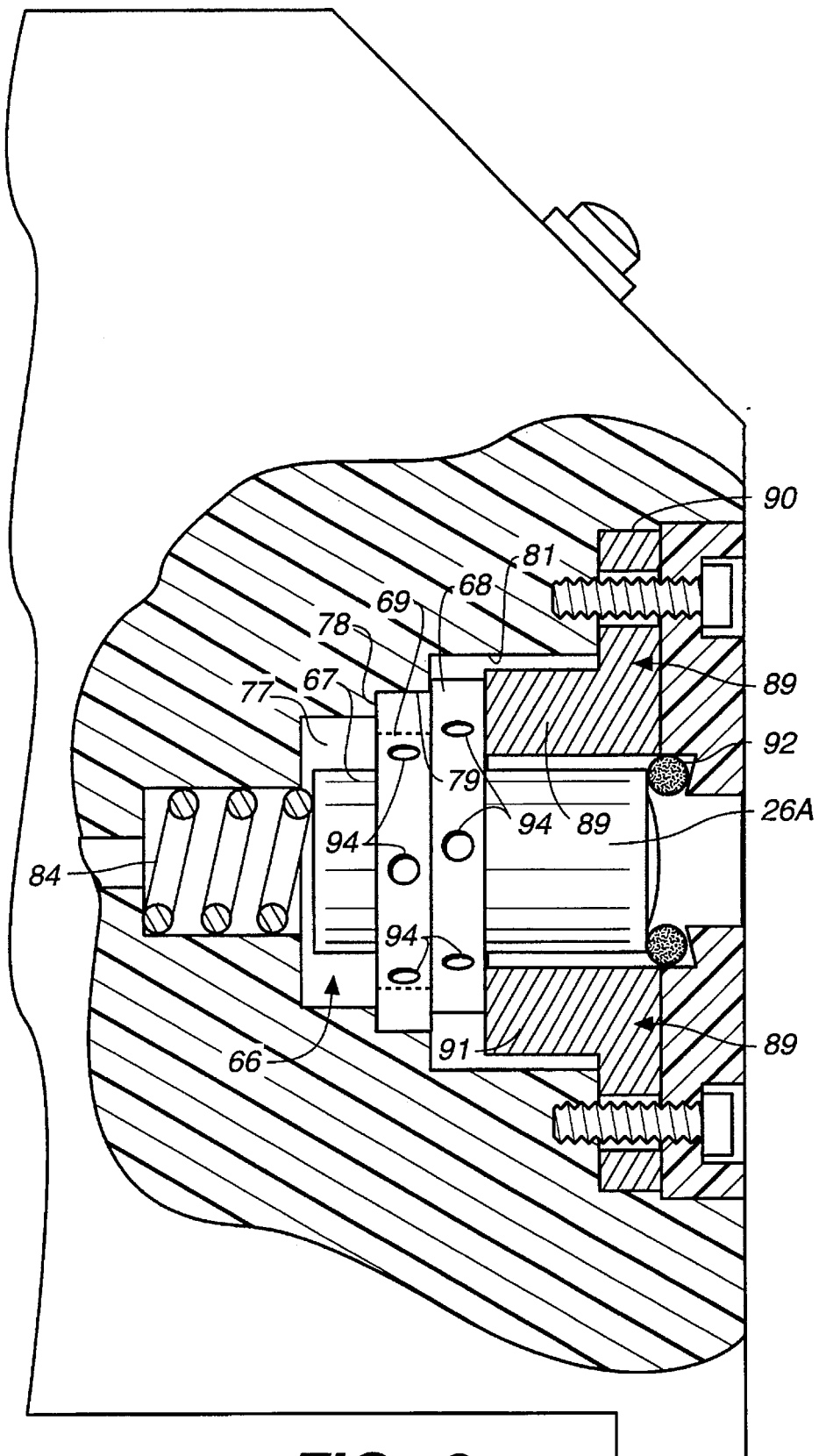
FIG._8

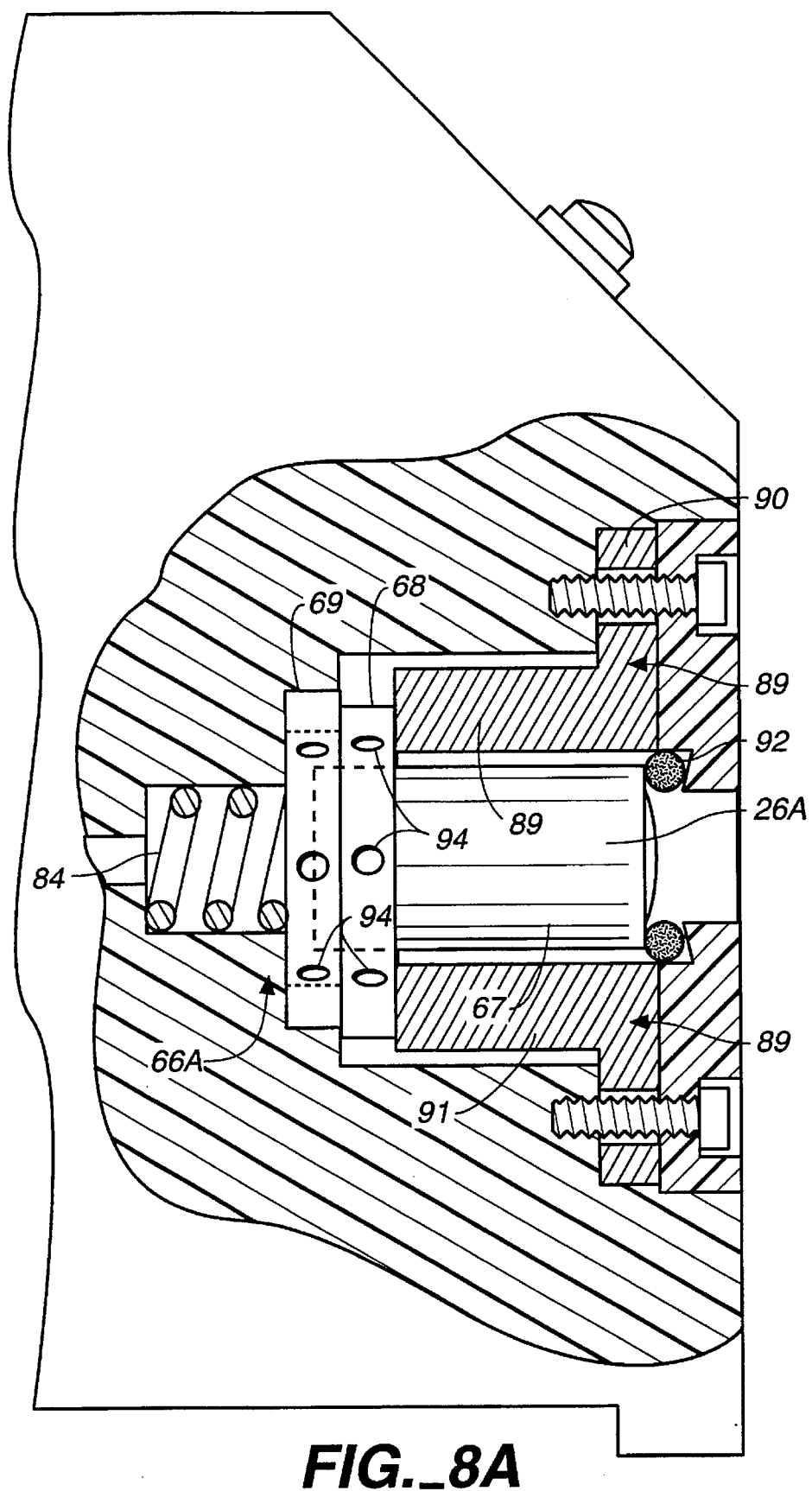
FIG._8A

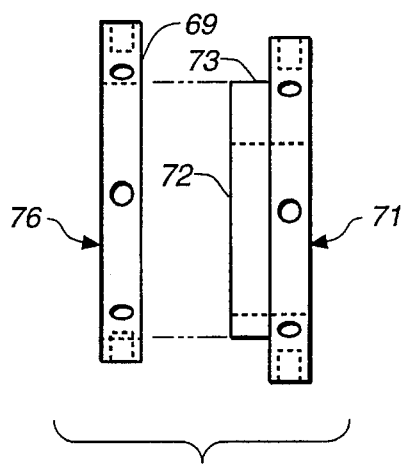
FIG._9
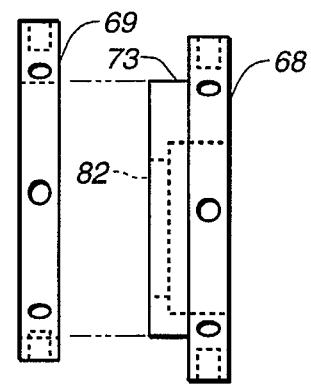
FIG._9A
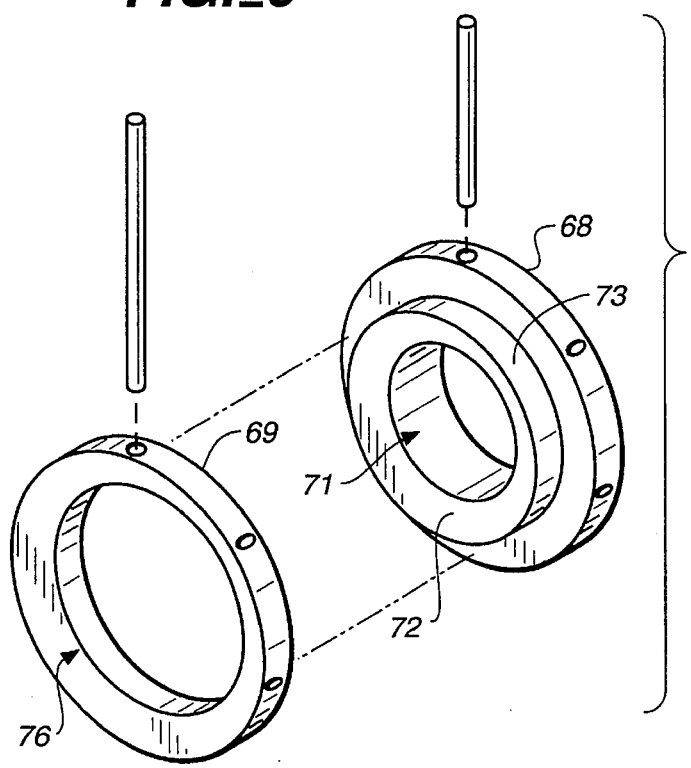
FIG._10
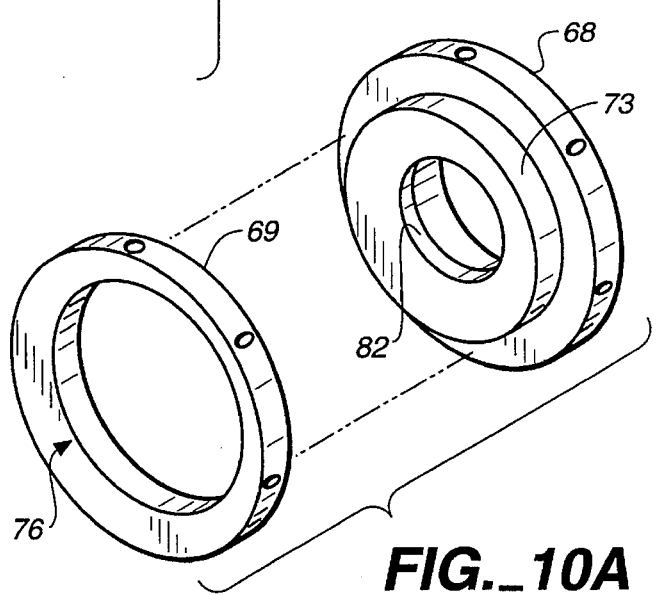
FIG._10A

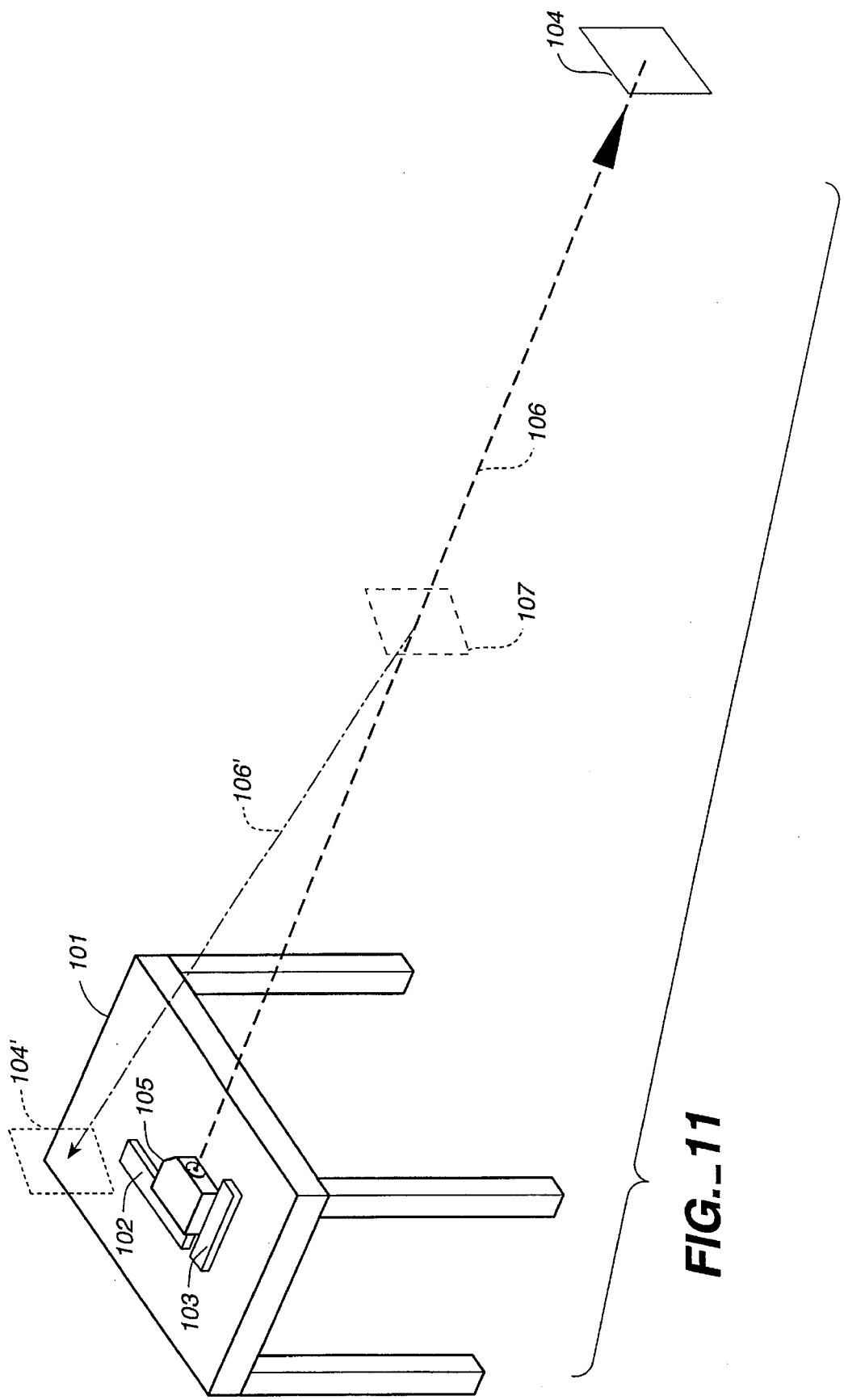
FIG._11

HAND-HELD BUILDER'S SQUARE AND STRING LINE DEVICE INCORPORATING A LASER

BACKGROUND OF THE INVENTION

The present invention relates to builders' tools such as used in the construction trades for establishing parallel, perpendicular or just straight reference lines in laying out frameworks, walls, foundations and the like, and is more particularly directed to such tools incorporating a laser.

In various construction projects such as constructing the framework for a building, constructing masonry walls, or remodeling existing structures, it is often necessary to establish reference lines parallel or perpendicular to a specified line or surface, for example, to assure that adjoining walls will be perpendicular to one another and perpendicular to the floor and ceiling or to measure deviations from perpendicularity. Traditionally this has been accomplished by laying out reference lines with string lines using bubble levels or by marking off the reference lines with conventional carpenter's levels and squares. More recently, a number of devices have been developed that employ laser beams to define reference lines.

An early precursor of such devices employing a light beam instead of a laser is shown in U.S. Pat. No. 2,877,555 of Visockis. This device mounts an electric light and flashlight batteries within an elongated carpenters level so as to project a pencil-like "flashlight" beam of light out one end of the level. The beam is intended to extend the effective length of the level with the object of obviating the need to reposition the level continually when aligning a large number of elements extending over a distance much greater than the length of the level itself. The Visockis patent suggests that the device would be useful in such situations as laying a floor or vertically aligning a brick wall.

A later such device is disclosed in European patent application EP 0 401 815 of LAWA GmbH. This device includes a laser mounted much like the electric light of U.S. Pat. No. 2,877,555 in an elongated carpenter's level for projecting a beam out one end of the level.

PCT patent application Publication No. WO 91/02217 of Hinkel discloses a laser straightedge device in the form of an elongated carpenter's level that includes an optical arrangement for splitting the laser beam and deflecting it in several directions within the device housing so as to project two or three laser beams in perpendicular directions to one another.

U.S. Pat. Nos. 3,897,637 and 4,333,242 of Genho disclose more complicated level devices that include a laser simultaneously providing two or three beams at 90 degrees to one another. In these devices the perpendicularity of the beams is established with appropriate optics including one or more beam splitters for optically defining the perpendicular beams. The units include bubble levels and threaded leveling screws for leveling the beams. The device of U.S. Pat. No. 4,333,242 additionally includes a servomechanism responsive to a pair of level vials for automatically adjusting the disposition of the unit relative to the surface on which it rests until the axis of each level vial is horizontal.

Yet another known such laser referencing device is disclosed in French patent application FR 2 636 732 of Berny. The laser is mounted in an elongated tube, and the laser beam is separated into two perpendicular beams by a beam splitter, which is mounted for rotation on a motor so that one beam is perpendicular to and rotates about the axis defined by the second beam. The rotating beam thus defines a plane perpendicular to the axis defined by the second beam.

U.S. Pat. Nos. 4,912,851 of Rando et al. and 5,075,977 of Rando disclose more complicated leveling and alignment tools incorporating a diode laser. These tools include a tilt compensation mechanism for use on surfaces which are not level so that the device will nevertheless deliver a truly plumb or truly horizontal beam.

The above devices are subject to one or more of the following drawbacks or deficiencies. They are complex, requiring on-board optical arrangements of mirrors, prisms and/or beam splitters, sometimes even including motors for rotating an optical element. They may be undesirably large, inconveniently heavy, or cumbersome to use. They may be optically delicate in the sense that they may be undesirably easily knocked out of alignment, and may require careful alignment or leveling on each use. Some devices include on-board mechanisms for referencing the laser beam to the true horizontal or true vertical and not to the surface on which the device is positioned, and so these devices are not useful for establishing non-horizontal or non-vertical reference lines. In any case they tend to be costly to manufacture. Even the simple devices of U.S. Pat. No. 2,877,555 or European patent application EP 0 401 815 share a disadvantage with some of the more complex devices: The reference line they provide is not sufficiently accurate.

SUMMARY OF THE INVENTION

The present invention provides a compact, low-cost, hand-held builder's tool for use in defining reference lines perpendicular and parallel to a specified surface. The tool effectively serves as a square for establishing perpendiculars and as a string line for establishing straight parallels over an extended range. The tool is convenient to use, accurate, lightweight, durable, and small enough to be carried in the user's pocket.

Briefly, the builder's tool comprises a small housing—small enough to fit conveniently in the user's hand—that includes a battery-powered laser for projecting a visible laser beam through an exit window in the housing over an extended range and also includes an on-board means within the housing for adjusting and setting the alignment of the laser beam in fixed disposition for establishing an accurate reference line. The housing has two generally parallel broad faces joined by a plurality of connecting faces extending substantially perpendicular to the broad faces. In a preferred embodiment the connecting faces are narrow relative to the broad faces giving the housing the general appearance of a pocket tape measure. Unlike a pocket tape measure, however, one of the broad faces and two of the perpendicular connecting faces taken together define three reference planes that are mutually perpendicular to one another within a margin sufficiently small that the tool has an accuracy suitable for use over an extended range of at least about 20 ft (about 6.1 m). A practical tool may even be made with an accuracy suitable for use over a range of about 60 ft (18.29 m) or more. The on-board alignment means enables the laser beam to be aligned in accurate perpendicularity to one of the mutually perpendicular reference planes and in accurate parallelism to the other two reference planes. In this way the builder's tool may project a line of laser light that is perpendicular to or parallel to a working surface in contact with one of the three faces defining the reference planes to within at least about ±⅛ inch (±3.175 mm) at 20 ft (i.e., at 6.10 m). Indeed, the mutual perpendicularity of the reference planes, and the laser beam alignment, may be established to a further accuracy of at least ±⅛ inch (±3.175 mm) at 60 ft (18.29 m).

Other aspects of the invention include particular practical on-board alignment mechanisms for aligning the laser beam that are simple, accurate, low-cost, and comparatively easy to manufacture, assemble and operate. Embodiments of an on-board screw-driven mechanism and an on-board cam mechanism are disclosed as examples.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of a first embodiment of a compact builder's reference line tool according to the invention.

FIG. 2 is a front elevational view of the embodiment of FIG. 1.

FIG. 3 is a sectional view of the tool of FIG. 2 along the line 3—3.

FIG. 4 is a perspective view of an alternative embodiment of the invention.

FIG. 5 is a front elevational view of the embodiment of FIG. 4.

FIG. 6 is a sectional view of the embodiment of FIG. 5 along the line 6—6.

FIG. 6A is a sectional view showing an alternative configuration of an alignment mechanism.

FIG. 7 is a perspective view of a further embodiment of the invention.

FIG. 8 is a partially cut-away side elevational view of the embodiment of FIG. 7 showing another on-board alignment mechanism.

FIG. 8A is a partially cut-away side elevational view of the embodiment of FIG. 7 showing an alternative on-board alignment mechanism.

FIG. 9 is an expanded view of alignment rings in the embodiment of FIG. 8.

FIG. 9A is an expanded view of alignment rings in the alternative embodiment of FIG. 8A.

FIG. 10 is an exploded perspective view of the alignment rings in the embodiment of FIGS. 8 and 9.

FIG. 10A is an exploded perspective view of the alternative alignment rings in the embodiment of FIGS. 8A and 9A.

FIG. 11 is a perspective view of an optical bench arrangement for setting the alignment of the builder's tool.

DETAILED DESCRIPTION OF ILLUSTRATIVE EMBODIMENTS

FIGS. 1–3 show a first embodiment of a compact, hand-held builder's reference line tool according to the invention for use as a square and string line. The tool is formed with a housing 10 that is generally palm-sized so that it may be held comfortably in the user's hand and conveniently carried in a pocket or a pouch of a workman's tool belt. Housing 10 has a general size and appearance similar to a pocket tape measure. The housing is formed with two broad faces 11 and 12 that are generally parallel to one another and which are joined by narrow connecting faces 13, 14, 15, 16 and 17 extending substantially perpendicular to broad faces 11 and 12. As an example of a convenient hand-held size, housing 10 may be formed with broad faces that are two to three inches (5 to 7.5 cm) on a side.

Although housing 10 has the external appearance of a simple flat box-like enclosure for its internal components, housing 10 also serves to define three mutually perpendicular reference planes, which establish the base from which the reference line established by the tool is measured. One of the reference planes is defined by one of the broad faces, for example, face 11. The other two reference planes are defined by the narrow faces 13 and 14. In the embodiment of FIG. 1 the faces 15, 16 and 17 do not necessarily define reference planes so that this portion of housing 10 may take other forms to meet the dictates of style, fabrication cost or other considerations.

Broad face 11 may itself take the form of a flat plane coincident with the corresponding reference plane. To fabricate a housing with a broad face that is flat to within an acceptable tolerance, however, will generally require special machining steps and precautions that would increase manufacturing cost significantly and that would otherwise not normally be undertaken in the fabrication of a housing to serve merely as an enclosure for its contents. For example, to be of practical value the builder's tool should project a reference laser beam that is accurately aimed over a minimum range of about 20 feet (6.10 m) and preferably over a range of about 60 feet (18.29 m) or more. To achieve a laser beam target accuracy with a tolerance of ±⅛ inch (±3.175 mm) over 20 feet, the faces defining the reference planes will have to be flat and perpendicular to one another to within this same tolerance, which corresponds to a flatness and perpendicularity runout of about ±6.25 mil/ft (±0.521 mm/m). To achieve this tolerance over a 60-foot range, the corresponding runout is ±2.08 mil/ft (±0.174 mm/m).

To assist in providing a manufacturable unit at lower cost while still meeting a strict flatness and perpendicularity tolerance, broad face 11 may be formed with a thin raised surface 21 of small area relative to face 11 as a whole that is flat within the specified tolerance and that defines the associated reference plane. If molded of plastic, thin raised surface 21 will generally be subject to reduced stresses, draft angle, and other variabilities normally encountered during the molding process. Whatever the selected material of fabrication, the reduced surface area of surface 21 provides for more efficient, hence less costly, machining for flatness. Through this simple expedient of defining the reference plane with a raised surface of reduced area, manufacturing cost may be reduced without compromising the flatness and perpendicularity tolerance of the final product. The recessed area within raised surface 21 also provides a convenient location for placement of an identification plate with a company logo or like informational or ornamental matter without requiring a demanding flatness tolerance on the plate.

In the normal use of the device, when housing 10 is positioned with broad face 11 against a working surface, it is of course the raised surface 21 that contacts the working surface so that the reference plane defined by raised surface 21 is parallel to the working surface. For stable positioning on a working surface, raised surface 21 lies proximal to at least three edges of broad face 11. In the embodiment depicted in FIG. 1, raised surface 21 follows the perimeter of face 11. Surface 21 may take other forms, however, and still define a stable reference plane parallel to the working surface. For example, FIG. 4 shows an alternative arrangement in which the raised surface comprises three small separate pads 22A disposed in the vicinity of three corners of face 12A. See also the corresponding pads 22B in the embodiment of FIG. 7.

Narrow faces 13 and 14, being of comparatively reduced area, may themselves be formed to be entirely flat; however, machining even these faces to the requisite flatness tolerance will involve an increased cost. Thus, the narrow faces 13 and 14 are also preferably formed with raised portions of more limited area to define the associated reference planes. For example, in the embodiments of FIGS. 4–6 and of FIG. 7 the corresponding narrow faces, identified by corresponding reference numerals 13A, 14A and 13B, 14B in the respective embodiments, are formed with feet 23A and 23B raised above the level of the surfaces 13A, 14A, 13B and 14B to define the associated reference planes.

The tolerances achievable by various molding, casting, machining processes and the like are well known to the skilled practitioner and need not be described here. Given the specifications described herein, those of ordinary skill in the art will be able to select the appropriate process or combination of processes for fabricating a builder's tool housing with the described properties.

Included within housing 10 is a small, low-power laser 26, which is mounted to project a laser beam through exit window 27 in front wall 15 in a direction generally perpendicular to rear narrow face 13 and parallel to narrow face 14 and broad face 11. For ease of fabrication laser 26 need only be mounted in the housing in a position of approximate perpendicularity and parallelism with respect to the reference planes. The tool also includes alignment means for setting the alignment of laser 26 so as to fix the laser beam in its accurate disposition perpendicular to face 13 and parallel to faces 14 and 11. In the embodiment of FIG. 1 exit window 27 is formed in a separate threaded cap 28 that is screwed into a tapped hole in the front face of housing 10. Those skilled in the art will appreciate that other exit window configurations may also be employed.

Laser 26 is connected to battery 31 through on-off switch 32 and LED indicator light 33. Although shown as a toggle switch in FIGS. 1–3, switch 32 may be provided by any convenient form of switch such as the rocker switch of FIGS. 4–6 and 6A or pushbutton switch of FIGS. 7, 8 and 8A. Housing 10 is formed with interior compartments 34 and 35 for laser 26 and battery 31. Separate compartments serve to isolate the laser from the battery compartment, which will be opened from time to time when the battery is changed. In a preferred arrangement battery compartment 35 is accessible through its own access port 36. This is desirable so that the battery may be changed without also opening the laser compartment so as to minimize the risk of inadvertently engaging the laser and altering the alignment. The interior partitions between compartments also provide greater structural integrity to the tool.

In keeping with the object of the invention to provide a small, simple, easy to manufacture, low cost square and string line tool, it is important to have an on-board mechanism for aligning the laser with respect to the reference planes. The embodiment of FIG. 1 employs an alignment mechanism of a type developed for gun sights such as disclosed in U.S. Pat. No. 5,299,375. That mechanism employs a solid state laser diode that is mounted on an adjustable platform 37. Platform 37 is attached to and spaced apart from a fixed base member 38 by three spacer posts disposed at three points around the base. One of the spacer posts establishes a fixed spacing between the platform and base at that point. This spacer post may be provided by a threaded machine screw 39F that screws into both the platform and base. The other two spacer posts are of adjustable length. The adjustable spacer posts are provided by double-threaded bolts 39A. (Only one bolt 39A is visible in FIG. 2.) Each bolt 39A has a first threaded portion 40 with a first thread pitch engaging platform 37 and a second threaded portion 41 with a second, different thread pitch engaging base 38. Because of the different thread pitches, turning either of these bolts causes relative angular movement of the base and platform out of parallelism with one another. The angular displacement of platform 37 and base 38 have been exaggerated in FIG. 2 for the sake of illustration. Laser 26 situated on platform 37 is aligned simply by turning the two adjustable-length bolts. Further details of the structure and operation of this form of alignment mechanism are disclosed in U.S. Pat. No. 5,299,375 and thus need not be given here.

The laser alignment mechanism of FIG. 1 was developed to withstand the high levels of repeated shock and vibration encountered in handguns and other firearms. While it can provide adequate alignment, it has been found that the features of its construction that make it stable under the conditions of repeated firearm discharges also make the alignment unnecessarily laborious and time-consuming to acquire. A first alternative embodiment of the invention, in particular employing an alternative alignment mechanism, is shown in FIGS. 4–6.

With reference to FIGS. 5 and 6, laser 26A is supported by an annular support member 42, the laser being held firmly in the central aperture of member 42. Three spacer posts, indicated generally by reference numeral 43, are distributed about the periphery of the laser. Each post connects support member 42 to a base member that is in fixed position with respect to housing 10A. In the embodiment of FIG. 6 the base member is provided by a portion of housing 10A at front face 15A, although other configurations could also be used such as a separate base member that is set into a recess in the front wall of housing 10A. Each of the spacer posts is provided by a threaded member such as threaded shaft 44 with an alignment head 45 at one end. Unlike the alignment mechanism of FIG. 2, the threads of shafts 44 have uniform pitch. In the embodiment of FIG. 6 support member 42 is formed with tapped holes 46 for receiving shafts 44. Although support member 42 is shown here as a separately formed member that is impressed around the laser body, other configurations are possible. For example, the laser body may be specially formed in a one-piece construction with a laterally extending flange or with a plurality of laterally extending tabs for receiving the spacer posts. The opposite ends of shafts 44 extend through (untapped) holes 47 in front face 15A, which are lined up in registration with tapped holes 46. The shafts are held in position at holes 47 by heads 45. Each post runs through the center of a helical compression spring 48, which extends between support member 42 and front face 15A. Springs 48 collectively serve to urge support member 42 away from the housing so as to remove any play in the position of the support member.

The alignment mechanism includes spring retaining means for retaining an end of each helical spring 48 at support member 42 and at the housing. As illustrated in FIG. 6, the spring retaining means at support member 42 is provided by a plurality of recesses 49 formed in the support member by the positions of tapped holes 46, which receive the ends of respective helical springs 48. Recesses may also be provided at the inwardly facing wall of the housing to receive and secure the opposite ends of the helical springs. Alternatively, the spring retaining means may be provided by spring cups 51 mounted on shafts 44 for receiving the forward ends of helical springs 48.

To assist in assembly of the laser and alignment mechanism, front face 15A of the housing is formed with three keyhole slots 52 for receiving heads 45. Each keyhole slot terminates in one of the untapped holes 47. The end of the slot at hole 47 is formed with a recess 53 to receive a head 45 of a spacer post 43 so that in assembled configuration the heads 45 will be approximately flush with, or slightly recessed from, the surface 54. In a preferred configuration, the surface 54 is itself recessed from the front surface of the housing. After the laser is aligned as explained more fully below, a cover member 57 is mounted in the recess to cover the alignment heads 45 for protection against inadvertently altering the alignment. Cover member 57 may be permanently secured in the recess to prevent the user from gaining access to the alignment heads, or it may be removably mounted, for example, by a threaded mounting, to permit access for re-alignment at a later time. Cover member 57 is of course formed with an exit port 58 for the laser beam. The port may simply consist of an aperture in the cover member, or, for added protection against contamination of the interior by dust or moisture, the port may include a transparent covering. A convenient and economical form of cover member is shown in FIG. 6, where cover member 57 is formed of transparent plastic, on which an opaque coating 59 is applied leaving a central area clear to define exit port 58.

An alternative configuration of a screw-thread alignment mechanism is shown in FIG. 6A, in which like components are labeled by like reference numerals. In this configuration support member 42 is formed with untapped through-holes 46A. A base member 50 is provided by a solid block affixed to the housing and positioned behind support member 42. In FIG. 6A base member 50 is shown as a separate piece from the housing, but it may also be cast in or otherwise integrally formed with the housing. Base member 50 includes tapped holes 47A for receiving threaded members 44. As shown in FIG. 6A base member 50 also includes a cavity for receiving a portion of the laser body. The cavity is sized to allow sufficient clearance for the laser body to move as the alignment is adjusted. Both the support member 42 and the base member 50 are formed with recesses 49A for receiving helical springs 48, which are now positioned on the opposite side of support member 42 from the configuration of FIG. 6. In this embodiment, the front rim of laser 26A abuts against an o-ring 61 that is held in position in a recess in the back side of front face 15A.

FIGS. 7–10 show an alternative alignment mechanism employing a cam arrangement indicated generally at reference numeral 66 (or 66A in FIG. 8A). As seen in FIGS. 7 and 8, laser 26A has a body portion 67 that is of a generally circularly cylindrical shape with the cylinder axis lying in the approximate direction of the laser beam. Cam arrangement 66 includes two alignment rings 68 and 69. Alignment ring 68 is formed with an eccentric circular opening 71 having a center that is slightly displaced from the center of ring 68. Circular opening 71 is sized to receive the circularly cylindrical body portion 67 of the laser. A raised portion 72 protrudes from a side of ring 68 and defines a circular cam surface 73 encircling the circular opening 71. Cam surface 73 is eccentric to circular opening 71; that is, the centers of the circular cam surface 73 and opening 71 are offset from one another. The second alignment ring 69 is also formed with an eccentric circular opening 76 with center offset from the center of ring 69. Circular opening 76 is formed to receive cam surface 73, which fits snugly, yet slidably within opening 76 so that ring 69 can rotate on cam surface 73. The housing includes a cavity 77 formed to receive alignment rings 68 and 69 mounted on the laser body. Cavity 77 is shaped and sized to capture ring 69 in a pre-determined location in the cavity. This is achieved in the embodiment of FIGS. 8 and 8A by locating ring 69 against back cavity wall 78 and capturing the circumference of the ring with step 79. Since cavity 77 engages the outer edge of ring 69, as the ring rotates, its circular opening 71 rotates eccentrically. Ring 68 is not captured by cavity 77 so it is free to move laterally as it is rotated about the cam surface 73 within opening 71. In the embodiments of FIGS. 8 and 8A this is achieved by providing a further step 81 in cavity 77. Alternatively, ring 68 may be formed with an outside diameter sufficiently smaller than that of the captured ring 69 to allow for the wobble caused by the offset of the circular opening 71. Thus, as rings 68 and 69 are rotated relative to one another, the laser cylinder axis undergoes a wobbling movement. To align the laser beam in a desired direction, rings 68 and 69 are rotated relative to one another until the laser beam "wobbles" into the desired direction, that is, until the beam is brought to the desired pitch and yaw angles.

As seen in the embodiment of FIGS. 8, 9, 10, the eccentric circular opening 71 of ring 68 extends all the way through raised portion 72, and the circularly cylindrical laser body portion 67 extends all the way through both rings 68 and 69 and through raised portion 72 so that the alignment rings are mounted at a midportion of the laser body.

In the alternative embodiment of FIGS. 8A, 9A, 10A, alignment ring 68 includes a stop member 82 in the form of a circular lip blocking one side of circular opening 71. A circularly cylindrical end of the laser is received in circular opening 71 and is held there against stop member 82. In either embodiment the laser is held flush against the front wall of the housing by pusher spring 84 at the back end of the laser.

To facilitate assembly of the laser and rings and mounting in the housing, an insert member 89 is provided having a forward annular portion 90 that rests against the front wall of the housing and a rear spacer portion 91 extending from annular portion 90 to the position of the first ring 68. Spacing portion 91 defines a generally cylindrical shape. The laser extends through the middle of insert member 89 and protrudes up against the front wall. An o-ring 92 around the aperture of annular portion 90 abuts against the laser and provides a cushion as well as needed play as the laser undergoes its wobbling movement during alignment.

To align the laser, rings 68 and 69 are provided with a means of engaging the rings at their outer surfaces. In the illustrated embodiment the engagement means is provided by a plurality of holes 94 formed in their outer surfaces spaced about their circumferences. To turn the rings a pair of levers 95 are inserted into the circumferential holes 94 of each ring. A slight pressure on the levers causes a relative rotation of the rings causing the laser to wobble into alignment. Alternatively, the outer surfaces of the rings may be provided with gear teeth for meshing with corresponding worm gears for each ring. A worm gear engagement may be utilized, for example, together with a feedback mechanism, discussed further below, for automatically aligning the laser.

The housing is provided with an access port 96 in one of the broad faces overlying the position of the rings for providing lever access to holes 94. After the initial alignment access port 96 may be covered with a cover plate to close off the interior of the housing and to prevent a user from tampering with the alignment.

Before the builder's tool can be used, the laser must be aligned with the mutually perpendicular reference planes defined by the tool housing. The alignment procedure is described with reference to the diagrammatic apparatus of FIG. 11. The alignment apparatus includes a vibrationally stable, optically flat bench 101 provided, for example, by a polished granite. The bench is leveled, and two rectangular blocks 102 and 103 are set on bench 101 perpendicular to one another and to the surface of the bench so as to define a corner for receiving the builder's tool to be aligned. Leveling the table and setting the blocks is a common initial alignment procedure employed with optical instrumentation. The detailed steps will be familiar to the practitioner in the art and thus need not be described in further detail here. A target 104 is placed at the desired range, for example, 100 feet. A standard surveyor's transit may be used to position the target accurately with respect to the position the exit window of a builder's tool 105 will occupy when the tool is set on bench 101. To facilitate the procedure, target 104 may be provide with indicia designating the center and may include a multifaceted reflective spot at dead center for brilliantly reflecting the laser beam when the beam hits the target dead center. When the bench and target are so aligned, then the tool to be aligned is set in position in the corner defined by blocks 102 and 103, and the angle of laser beam 106 is adjusted by means of the on-board alignment mechanism until the beam hits the target.

An apparent drawback of this alignment method is that it requires an unobstructed course of 100 feet in order to space the target 100 feet from the tool being aligned. To avoid this drawback in circumstances in which adequate space is not available, optical elements may be introduced into the path of the laser beam to bend the path into a smaller space. In FIG. 11 an idealized reflective element 107 (shown in phantom) is positioned at the half-way point along the optical path to reflect the beam back toward the target 104' positioned on bench 101, where it may be more conveniently observed. Further optical elements may be introduced to fold the optical path into yet a smaller area. Such optical arrangments are well known and need not be described in detail here.

To assist in the mass fabrication of builder's tools according to the invention, an automatic alignment arrangement may be employed for the initial alignment. For the target 104 (104') a detector may be used such as a CCD array with appropriate optical front end to receive the laser beam and provide an electrical signal indicative of the position that the laser beam strikes. The detector output is then coupled to the on-board alignment means through a servomechanism that automatically corrects the laser beam alignment until it is acquired by the target bulls-eye. For this purpose the cammed on-board alignment means of FIGS. 7-10 with the worm gear engagement means, referred to above, on the outer surfaces of alignment rings 68, 69 provides a convenient on-board alignment means for coupling to the servomechanism.

It is emphasized that although the housing 10 may appear to be a simple box-like container differing little from other box-like housings found in the prior art for other types of devices, the requirement that the sides define three mutually perpendicular reference planes according to the invention is not normally found in hand-held builders' tools such as the leveling devices disclosed in the above-referenced patents. While a simple box-like housing of the prior art may look like the housing of the present invention to the casual user, the apparent flatness of typical prior art box-like housings is deceiving and is insufficient for the purpose of the present invention. For example, minor departures from flatness not even visible to the unaided eye may nevertheless produce a very slight unsteadiness of the housing when placed on a working surface. While this unsteadiness would ordinarily be negligible, if even perceptible at all, in a prior art bubble level for example, in a device according to the present invention the unsteadiness will produce an unacceptable jittering in the laser beam projected as little as a few feet away. The resulting uncertainty in the position of the laser spot would greatly diminish if not defeat the usefulness of the device for establishing a reliable reference line or reference perpendicular. Moreover, one would not ordinarily be motivated in the routine manufacture of a box-like housing to provide the flatness and perpendicularity required of the housing here. Molding or casting processes, for example, will not by themselves produce sufficiently flat and perpendicular faces. Some form of machine preparation of the surfaces is generally required. Simple machining to square off a housing adequate for a pocket level, for example, will not normally be adequate to produce the flatness and perpendicularity required of the present invention. The need for adequate flatness and perpendicularity was arrived at only after significant development effort and is not to be mistakenly identified with the apparently flat and rectangular box-like housings for hand-held builders' tools in the prior art.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the specific embodiments described and illustrated above, but is defined by the appended claims.

What is claimed is:

1. A compact builder's tool for defining a reference line over an extended range, comprising:

a housing sized to be hand-held having first and second broad spaced-apart parallel faces and a plurality of narrow faces joining said broad faces and extending substantially perpendicular thereto, said plurality of narrow faces including first and second narrow faces defining first and second reference planes that are substantially perpendicular to one another;

wherein at least one of said broad faces has a raised surface proximal to at least three edges of said at least one broad face, said raised surface being of small area relative to said at least one broad face and defining a third reference plane;

wherein said first, second and third reference planes are mutually perpendicular to one another;

a laser beam exit window in said housing positioned opposite said first narrow face;

a battery-powered laser mounted within said housing for projecting a visible laser beam through said exit window over said extended range; and alignment means within said housing for setting the alignment of said laser beam perpendicular to said first reference plane and parallel to said second and third reference planes;

whereby said tool defines a line of laser light perpendicular to a working surface in contact with said first narrow face and parallel to a working surface in contact with said second narrow face or in contact with said at least one broad face.

2. The apparatus of claim 1 wherein said alignment means comprises:

a support member fixed to said laser for supporting said laser;

a base member in fixed disposition with respect to said housing;

a plurality of alignment posts, each post connecting said support member to said base member;

wherein said alignment posts are distributed about the periphery of said laser, and wherein at least two of said alignment posts are of adjustable length for adjusting the spacing of said support member from said base member and thereby adjusting the direction of said laser beam.

3. The apparatus of claim 2 wherein said base member and said support member are arranged with said base member positioned in front of said support member.

4. The apparatus of claim 3 wherein said base member is formed in a front wall of said housing.

5. The apparatus of claim 3 wherein said alignment posts of adjustable length each comprise;

a threaded member and a head at a first end of said threaded member, said head being formed to maintain said threaded member in position at said base member; and said support member is formed with threaded holes to receive said threaded members;

whereby the lengths of said adjustable posts, and hence the spacing of said support member, may be adjusted by turning said threaded members.

6. The apparatus of claim 5, further comprising:

spring biasing means for urging said support member away from said base member, thereby to remove play in the position of said support member.

7. The apparatus of claim 6 wherein said spring biasing means comprises a plurality of helical springs, each helical spring being mounted about a said threaded member with the threaded member extending through the middle thereof, each said helical spring extending between said support member and said base member.

8. The apparatus of claim 7, further comprising spring retaining means for retaining an end of each said helical spring in position at at least one of said base member and said support member.

9. The apparatus of claim 8 wherein said spring retaining means comprises a spring cup mounted on said threaded member for receiving an end of a said helical spring.

10. The apparatus of claim 8 wherein said spring retaining means comprises a recess formed in said at least one of said base member and said support member, said recess being sized and positioned for receiving an end of a said helical spring.

11. The apparatus of claim 2 wherein said base member and said support member are arranged with said support member positioned in front of said base member.

12. The apparatus of claim 11 wherein said alignment posts of adjustable length each comprise;

a threaded member and a head at a first end of said threaded member, said head being formed to maintain said threaded member in position at said support member; and said base member is formed with threaded holes to receive said threaded members;

whereby the lengths of said adjustable posts, and hence the spacing of said support member, may be adjusted by turning said threaded members.

13. The apparatus of claim 12, further comprising:

spring biasing means for urging said support member away from said base member, thereby to remove play in the position of said support member.

14. The apparatus of claim 13 wherein said spring biasing means comprises a plurality of helical springs, each helical spring being mounted about a said threaded member with the threaded member extending through the middle thereof, each said helical spring extending between said support member and said base member.

15. The apparatus of claim 14, further comprising spring retaining means for retaining an end of each said helical spring in position at at least one of said base member and said support member.

16. The apparatus of claim 15 wherein said spring retaining means comprises a spring cup mounted on said threaded member for receiving an end of a said helical spring.

17. The apparatus of claim 15 wherein said spring retaining means comprises a recess formed in said at least one of said base member and said support member, said recess being sized and positioned for receiving an end of a said helical spring.

18. The apparatus of claim 1 wherein said alignment means comprises:

cam means for producing wobbling movement of said laser body for aligning said laser beam in said fixed disposition.

19. The apparatus of claim 18 wherein said laser has a circularly cylindrical body portion with cylinder axis generally in the direction of said laser beam and said cam means comprises:

first and second alignment rings;

said first alignment ring having a first eccentric circular opening formed therein for receiving said circularly cylindrical body portion and having a raised portion protruding from a side of said first alignment ring, said raised portion defining a circular cam surface about said first eccentric circular opening eccentric to said first eccentric circular opening; and said second alignment ring having a second eccentric circular opening formed therein for receiving said cam surface; and ring receiving means in said housing for receiving said alignment rings and permitting rotation thereof about their respective centers;

wherein said ring receiving means and said alignment rings are disposed so that rotation of said alignment rings about the centers thereof causes wobbling movement of said laser cylinder axis for aligning said laser beam in a desired direction.

20. The apparatus of claim 19 wherein said raised portion is formed with a third circular opening coaxial with said first eccentric circular opening and wherein said laser circularly cylindrical body portion extends through said first, second and third circular openings, whereby said alignment rings are mounted on said laser at a midportion thereof.

21. The apparatus of claim 19 wherein said first alignment ring includes a stop member blocking said first eccentric circular opening at one side thereof, wherein said laser circularly cylindrical body portion defines an end of said laser, and wherein said end is received in said first eccentric circular opening and maintained therein against said stop member, whereby said alignment rings are mounted on said laser at an end thereof.

22. The apparatus of claim 19, further comprising engagement means at the outer surface of each of said first and second alignment rings for use in rotating said alignment rings.

23. The apparatus of claim 22 wherein said engagement means comprises a plurality of holes formed in the outer surface of each of said first and second alignment rings for receiving a lever arm for use in rotating said alignment rings.

24. The apparatus of claim 22 wherein said housing includes an access port positioned over said alignment rings for providing access to said engagement means for rotation of said alignment rings.

25. The apparatus of claim 1 wherein said housing is formed with a first compartment for housing said laser and a second, separate compartment for housing a battery for powering said laser.

26. The apparatus of claim 25 wherein said housing includes an access port disposed to provide access to said second compartment without providing access to said first compartment for changing said battery without disturbing the alignment of said laser in said first compartment.

27. A compact builder's tool for defining a reference line over an extended range, comprising:

a housing sized to be hand-held and having first and second broad spaced-apart parallel faces and a plurality of connecting faces joining said broad faces and extending substantially perpendicular thereto, said plurality of connecting faces including first and second connecting faces having portions that are formed to lie flat within a tolerance of about ±6.25 mil/ft so as to define first and second reference planes, and said first broad face having a portion formed to lie flat within said tolerance so as to define a third reference plane;

wherein said first, second and third reference planes are mutually perpendicular to one another to within said tolerance;

a laser beam exit window in said housing positioned opposite said first connecting face;

a battery-powered laser mounted within said housing for projecting a visible laser beam through said exit window over said extended range; and alignment means for adjusting and maintaining the alignment of said laser beam in fixed disposition perpendicular to said first reference plane and parallel to said second and third reference planes;

whereby said tool defines a line of laser light perpendicular to a working surface in contact with said first connecting face and parallel to a working surface in contact with either one of said second connecting face or said first broad face.

28. The apparatus of claim 27 wherein said first broad face has a raised surface proximal to at least three edges of said first broad face, said raised surface being of small area relative to said first broad face and defining said third reference plane.

29. The apparatus of claim 28 wherein said first and second connecting faces each have raised surfaces proximal to at least three edges thereof, said raised surfaces being of small area relative to said respective first and second connecting faces and defining said first and second reference planes.

30. A method of aligning a compact hand-held builder's tool for defining a reference line over an extended range, said tool comprising a housing having three faces defining three mutually perpendicular reference planes and an exit window opposite one of said reference planes, said housing including a laser disposed to project a laser beam through said exit window, wherein said method comprises the steps of:

spacing said laser from said exit window within said housing with at least three spacer posts, wherein at least two of said posts are of adjustable length;

securing the tool in a position wherein said references planes are disposed in pre-determined reference position;

providing a target in prescribed position with respect to said pre-determined reference position;

energizing said laser to produce a laser beam directed through said exit window in the general direction of said target; and adjusting the length of said at least two spacer posts of adjustable length until said laser beam strikes said target.

31. The method of claim 30, wherein said laser is spaced from said exit window with three and only three spacer posts, each said three spacer posts being of adjustable length; and said adjusting step comprises adjusting the length of said three and only three spacer posts until said laser beam strikes said target.

32. A method of aligning a compact hand-held builder's tool for defining a reference line over an extended range, said tool comprising a housing having three faces defining three mutually perpendicular reference planes and an exit window opposite one of said reference planes, said housing including a laser disposed to project a laser beam through said exit window, wherein said method comprises the steps of:

mounting said laser for pitch and yaw movement about an axis generally perpendicular to said exit window;

securing the tool in a position wherein said references planes are disposed in pre-determined reference position;

providing a target in prescribed position with respect to said pre-determined reference position;

energizing said laser to produce a laser beam directed through said exit window in the general direction of said target; and applying a cam force to said laser so as to adjust the pitch and yaw of said laser until said laser beam strikes said target.

* * * * *